United States Patent
Duong

(10) Patent No.: US 8,976,269 B2
(45) Date of Patent: Mar. 10, 2015

(54) COMPRESSIVE SENSING BASED BIO-INSPIRED SHAPE FEATURE DETECTION CMOS IMAGER

(71) Applicant: California Institute of Technology, Pasadena, CA (US)

(72) Inventor: Tuan A. Duong, Glendora, CA (US)

(73) Assignee: California Institute of Technology, Pasadena, CA (US)

( * ) Notice: Subject to any disclaimer, the term of this patent is extended or adjusted under 35 U.S.C. 154(b) by 72 days.

(21) Appl. No.: 13/925,583

(22) Filed: Jun. 24, 2013

(65) Prior Publication Data

US 2013/0342681 A1   Dec. 26, 2013

Related U.S. Application Data

(60) Provisional application No. 61/663,320, filed on Jun. 22, 2012.

(51) Int. Cl.
| | |
|---|---|
| H04N 5/262 | (2006.01) |
| G06K 9/32 | (2006.01) |
| G06K 9/00 | (2006.01) |
| G06K 9/20 | (2006.01) |
| G06K 9/46 | (2006.01) |

(52) U.S. Cl.
CPC .......... *G06K 9/3241* (2013.01); *G06K 9/00986* (2013.01); *G06K 9/20* (2013.01); *G06K 9/4619* (2013.01)
USPC ............... 348/239; 348/207.99; 382/115

(58) Field of Classification Search
CPC ..................................... H04N 5/262
USPC ................................ 382/100, 115
See application file for complete search history.

(56) References Cited

U.S. PATENT DOCUMENTS

| | | | |
|---|---|---|---|
| 5,479,579 A | 12/1995 | Duong et al. | |
| 6,513,023 B1 | 1/2003 | Duong | |
| 7,711,157 B2 | 5/2010 | Duong et al. | |
| 8,340,435 B2 | 12/2012 | Duong et al. | |
| 2012/0229694 A1* | 9/2012 | Steinberg et al. | 348/352 |
| 2013/0271548 A1* | 10/2013 | Morgan et al. | 347/198 |
| 2014/0085501 A1* | 3/2014 | Tran | 348/222.1 |

OTHER PUBLICATIONS

E. Candès, J. Romberg, and T. Tao, "Robust uncertainty principles: Exact signal reconstruction from highly incomplete frequency information," *IEEE Trans. Inform. Theory*, vol. 52, pp. 489-509, Feb. 2006.

Richard G. Baraniuk and Michael B. Wakin, "*Random Projections of Smooth Manifolds,*" *Proc. Int. Conf. Acoustics, Speech, Signal Processing (ICASSP)*, May 2006.

E. Fossum, "Low Power Camera-On-A-Chip Using CMOS Active Pixel Sensor Technology," *Proc. of IEEE Symposium on Low Power Electronics*, San Jose, CA, Oct. 8-10, 1995.

(Continued)

*Primary Examiner* — Tuan Ho
(74) *Attorney, Agent, or Firm* — Steinfl & Bruno LLP

(57) ABSTRACT

A CMOS imager integrated circuit using compressive sensing and bio-inspired detection is presented which integrates novel functions and algorithms within a novel hardware architecture enabling efficient on-chip implementation.

19 Claims, 13 Drawing Sheets

(56) References Cited

OTHER PUBLICATIONS

T.A. Duong "Real Time On-Chip Sequential Adaptive Principal Component Analysis for Data Feature Extraction and Image Compression", *GOMAC Tech-03*, vol. I, pp. 460-464, Tampa, Florida, Mar. 31-Apr. 3, 2003.

D. L. Donoho, "Compressed sensing," *IEEE Trans. Information Theory*, vol. 52, No. 4, pp. 1289-1306, Apr. 2006.

E. J. Candès and T. Tao, *"Decoding by linear programming,"* pp. 1-22, Dec. 2005.

M. Rudelson and R. Veshynin, "Geometric approach to error correcting codes and reconstruction of signals," pp. 1-17, 2005.

E. J. Candès and T. Tao, "Near-optimal signal recovery from random projections: Universal encoding strategies?," pp. 1-39, Dec. 2006.

Tuan A. Duong, S.P. Eberhardt, T. Daud, and A. Thakoor, "Learning in neural networks: VLSI implementation strategies," In: *Fuzzy logic and Neural Network Handbook*, Chap. 27, Ed: C.H. Chen, McGraw-Hill, 1996.

Ashok, M. A. Neifeld, "Pseudrandom phase masks for superresolution imaging form subpixel shifting," *Appl. Opt.* 46, 2256-2268 (2007).

E. Fiesler, S. Campbell, L. Kempen, and T. Duong. "Color Sensor and Neural Processor on One Chip." International Symposium on Optical Science, Engineering, and Instrumentation, Proc. of the SPIE, vol. 3455 'Applications and Science of Neural Networks, Fuzzy Systems, and Evolutionary Computation', pp. 214-221, 1998.

Tuan A. Duong, Vu A. Duong and Allen R. Stubberud, "Shape and Color Features for Object Recognition Search," Handbook of Pattern Recognition and Computer Vision, Chap. 1.5, Ed. C.H. Chen, 4th Edition by World Scientific Publishing Co. Pte. Ltd, Jan. 2010.

T.A. Duong, "Mapping Pixel Windows to Vectors for Parallel Processing" NASA Tech Briefs, vol. 20, No. 3, pp. i1-i2, 1996.

Tuan A. Duong, S. Kemeny, T. Daud, A. Thakoor, C. Saunders, and J. Carson, "Analog 3-D Neuro-processor for Fast Frame Focal Plane Image Processing," The Industrial Electronics Handbook, Chap. 73, Ed.-In-Chief J. David Irwin, CRC Press, 1997.

S.K. Mendis, et al, "CMOS Active Pixel Image Sensors for Highly Integrated Imaging Systems," IEEE J. Solid-State Circuits, vol. 32, No. 2, Feb. 1997.

T. A. Duong and Allen R. Stubberud, "Convergence Analysis of Cascade Error Projection: An Efficient hardware learning algorithm", International Journal of Neural System, vol. 10, No. 3, pp. 199-210, Jun. 2000.

J. A. Tropp and A. C. Gilbert, "Signal Recovery From Random Measurement Via Orthogonal Matching Pursuit," IEEE Trans. Information Theory, vol. 53, No. 12, pp. 4655-4666, Dec. 2007.

\* cited by examiner

FIG. 1 - PRIOR ART

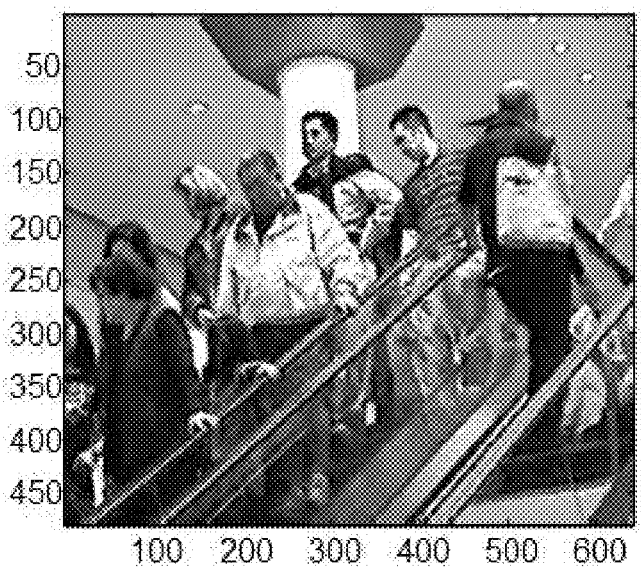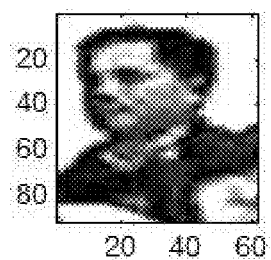
FIG. 10B
FIG. 10A

| 100 trails experiment | Mutual Correlation (JPL) | | Basis Pursuit (Caltech) | |
|---|---|---|---|---|
| | MSE | CPU Time | MSE | CPU Time |
| N=512, M=100, K=20, Val=+/-1 | <1e-3 | 0.1530 | <1e-3 | 0.3535 |
| N=512, M=100, K=20, Val=rand | <1e-3 | 0.1476 | <1e-3 | 0.5559 |
| N=4096, M=1024, K=160, Val=+/-1 | <1e-3 | 93 sec | <1e-3 | 137 sec |
| N=4096, M=1024, K=160, Val=rand | <1e-3 | 152 sec | <1e-3 | 265 sec |

Table 1

FIG. 13

COMPRESSIVE SENSING BASED BIO-INSPIRED SHAPE FEATURE DETECTION CMOS IMAGER

CROSS-REFERENCE TO RELATED APPLICATIONS

The present application claims priority to U.S. provisional Patent Application Ser. No. 61/663,320, filed on Jun. 22, 2012, for a "Compressive Sensing based Bio-Inspired Shape Feature Detection CMOS Imager", which is herein incorporated by reference in its entirety.

STATEMENT OF GOVERNMENT GRANT

The invention described herein was made in the performance of work under a NASA contract, and is subject to the provision of Public Law 96-517 (35 USC 202) in which the Contractor has elected to retain the title.

FIELD

The present disclosure relates to signal and image processing used in integrated CMOS imager chips. In particular, dynamic object recognition features to enable effective real time processing with low cost and without compromising information manifold quality is presented.

BACKGROUND

Recently, Compressive Sensing (CS), also known as compressed sensing, compressive sampling or sparse sampling, has attracted a lot of attention in the areas of signal, image processing, and communication due to a breakthrough in sampling rate reduction (e.g. with respect to the Nyquist sampling rate) whether it is in time/frequency or spatial/frequency domain. The person skilled in the art of signal processing knows that CS takes advantage of a signal's sparseness or compressibility in some domain, allowing the entire signal to be determined from relatively few measurements. CS also opens a new horizon for collecting quality sensory data due to the combination of new developments in sensing arrays to enhance the response time while reducing the number of sampling measurements as allowed by CS. Fortunately, the quality of information obtained through compressive sensing and in spite of the reduction of sampling rate (below Nyquist rate or below spatial rate of coarse pixel resolution) can be as unique as the information in Nyquist rate or fine pixel resolution [see refs. 1 and 2, incorporated by reference in their entirety]. This can help dynamic object recognition implementations for effective real time processing with associated low cost hardware implementation (e.g. computational imaging) without compromising information manifold quality.

In one example, the Defense Advanced Research Projects Agency (DARPA) has identified the role of computational imaging to reduce the demand of Size, Weight and Power (SWaP) on the actual imaging hardware, without losing the quality of the actual knowledge gathered. Indeed, compressive sensing is one of such emerging and extremely powerful techniques to enable meeting DARPA's goal.

FIG. 1 shows a functional system building block for a computational imaging used in a complementary metal-oxide-semiconductor (CMOS) imager integrated chip (IC). In the prior art embodiment of FIG. 1, a non-overlapped sub-window (n×n) from an (N×N) sub-pixel active-pixel sensor (APS) array (block A) is compressed through a projection matrix (block B) to obtain a compressive image (block C). For example, an (n×n) sub-pixel array (e.g. corresponding to a sub-window (n×n)) is compressed to (m) values to obtain a (m×1) vector. The (m×1) vectors obtained by compressing all the (n×n) sub-pixel arrays (e.g. corresponding to all of the non-overlapped (n×n) sub-windows contained within the (N×N) sub-pixel array), are correlated between input image for each non-overlapped sub-window (n×n) and predetermined targets, to find the best match to a predetermined target in a database. The correlation level will indicate the potential match to a predetermined target and its location in the focal plane (N×N). The combination of recovery image, target types and location will be shown in block D (e.g. in the soldier goggle).

Current CMOS imagers, such as one depicted in FIG. 1 using an APS sensor, are low power and low cost, but are typically a noisier visual sensing approach [see ref. 3, incorporated herein by reference in its entirety] as compared to a CCD visual sensing approach. A CMOS imager with fast frame rate, high quality image and intelligent processing on chip can be attractive to certain tasks and/or systems, such as for example in the case of an unmanned aerial vehicle (UAV), to enable spatial, temporal, or functional capabilities required by an individual warfighter. However, the integration of high quality CMOS imager and intelligent on-chip processing has been done [see ref. 4 incorporated herein by reference in its entirety] and has faced the challenges of speed, power, quality, detection accuracy and tracking performance and was thus unable to meet the requirements of for example an autonomous miniaturized UAV as defined for example by DARPA.

SUMMARY

Throughout the present disclosure reference will be made to the enclosed Appendices A, B, C, D, E and F, which make integral part of the present disclosure. Furthermore, throughout the present disclosure reference will be made (e.g. within brackets) to various documents (e.g. [ref. x] for reference to document number x), a detailed list of which is included at the end of the present disclosure. All such documents are incorporated herein by reference in their entirety.

According to a first aspect of the present disclosure, a compressive sensing-based bio-inspired shape feature detection imager circuit is presented, the imager circuit comprising a plurality of circuits operatively coupled to one another, the plurality of circuits comprising: an active pixel sensor array configured to collect an image in an original space and generate an analog representation of the collected image; a bio-inspired shape feature compressive sensing projection matrix circuit configured to project the analog representation of the collected image simultaneously onto each target bio-inspired feature of a set of target bio-inspired features and map the projected image from an original space to a compressive sensing space, and generate i) correlation data of the projected image in the compressive sensing space to the set of target bio-inspired features, and ii) reference position data in the original space for the collected image; a target detection and location circuit configured to process the correlation data and the reference position data to identify a potential target in the collected image from amongst the set of target bio-inspired features; a compressive sensing sampling data array circuit configured to process the projected image in the compressive sensing space to recover a digital representation of the collected image in the original space, and generate position and identity information of an identified potential target within the recovered collected image in the original space;

and an adaptive target extraction circuit configured to track the identified potential target in a next collected image and extract a corresponding new feature from the next collected image to add to the set of target bio-inspired features.

According to a second aspect of the present disclosure, a method used in an imager integrated circuit (IC) for detecting a potential target feature from a collected image is presented, the method comprising: storing in the imager IC a plurality of compressive sensing bio-inspired representations of a plurality of target features into a projection matrix; dividing in the imager IC the collected image into a plurality of non-overlapping sub-windows of a same size; projecting in the imager IC a sub-window of the plurality of sub-windows onto the projection matrix; based on the projecting, obtaining in the imager IC a compressive sensing sub-window; generating in the imager IC correlation data of the compressive sensing sub-window to the plurality of target features; assigning in the imager IC reference position of the sub-window within the collected image to the correlation data; repeating the projecting, obtaining, generating and assigning for all sub-windows of the plurality of sub-windows; evaluating in the imager IC the correlation data for all sub-windows; based on the evaluating, determining in the imager IC a detected potential target; recovering in the imager IC the collected image based on the compressive sensing sub-windows; and based on the assigning and the determining and the recovering, identifying in the imager IC the detected potential target within the recovered collected image.

Further aspects of the disclosure are shown in the specification, drawings and claims of the present application.

BRIEF DESCRIPTION OF THE DRAWINGS

FIG. 10A shows a first video frame of the video sequence of FIG. 11, and FIG. 10B shows a selected feature of the video frame shown in FIG. 10A.

FIG. 13 shows simulation results for recovery of four CS data sets with respect to mean square error (MSE) and central processing unit (CPU) using the MC algorithm and a basis pursuit (BP) algorithm.

DETAILED DESCRIPTION

Figure 1:
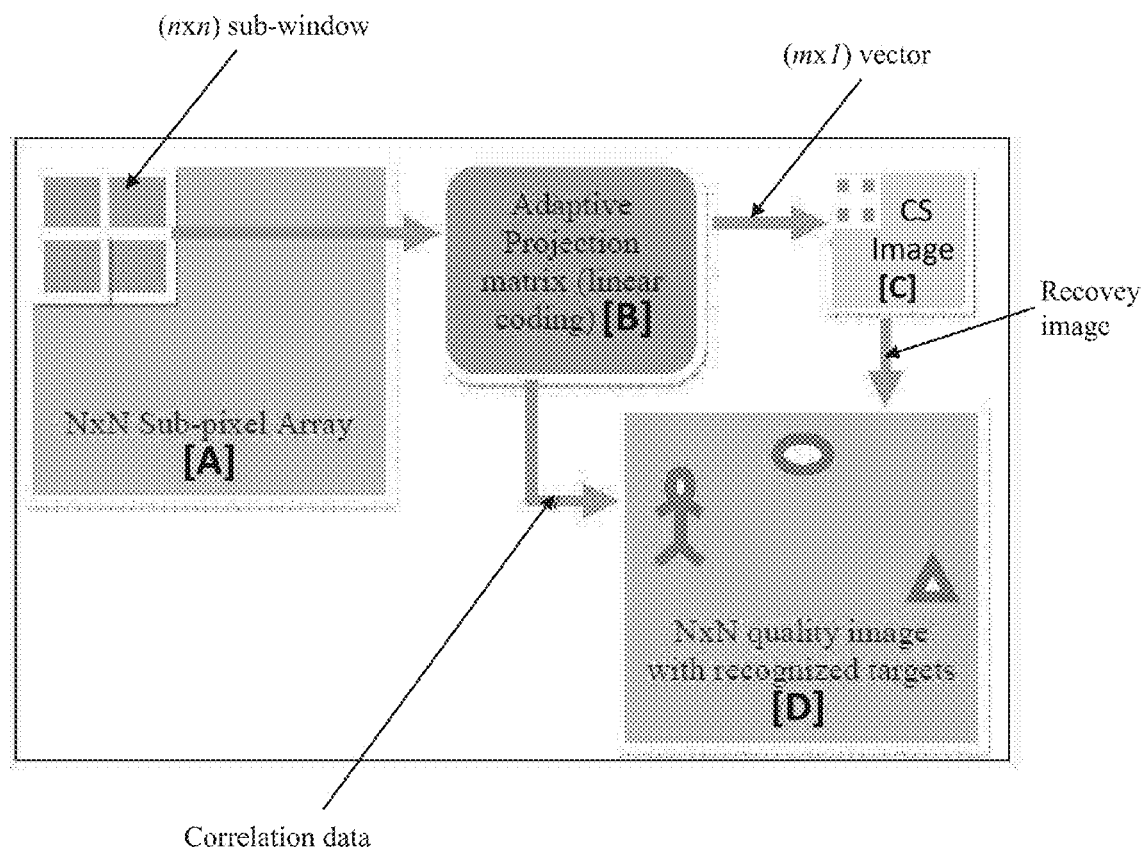
FIG. 1 shows a functional system building block for a prior art computational imaging integrated circuit (IC).
Figure 2:
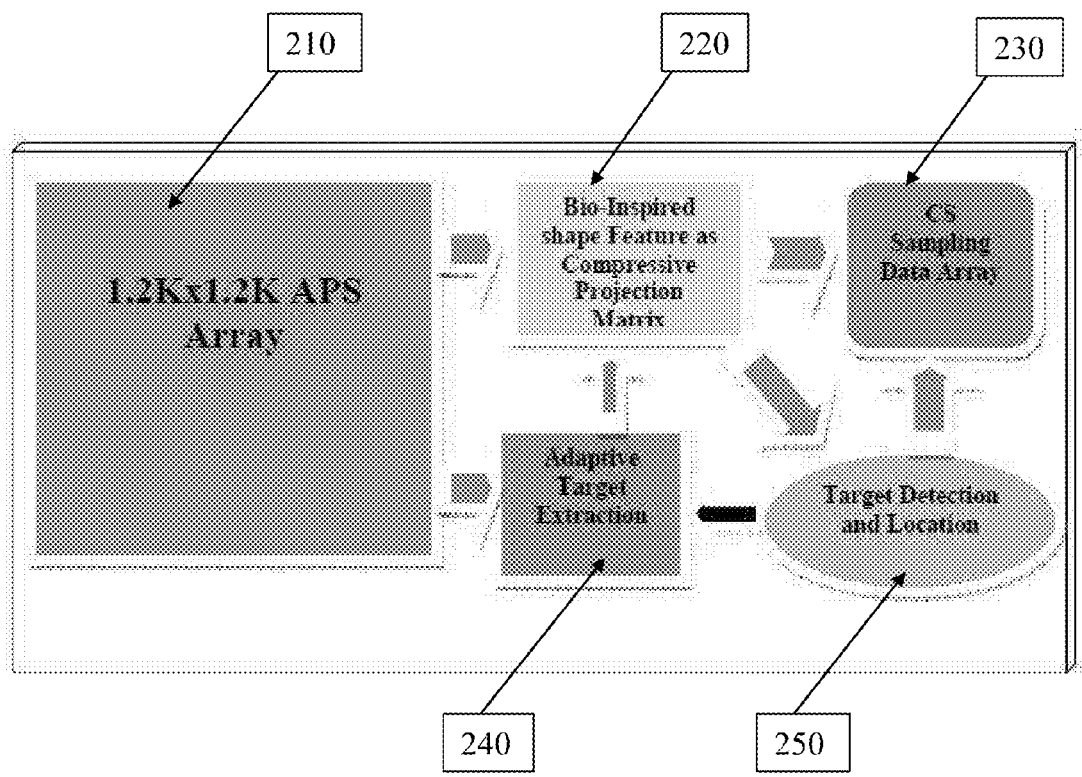
FIG. 2 shows a functional system building block according to an embodiment of the present disclosure of a compressive sensing bio-inspired shape feature detection CMOS imager IC.

According to an embodiment of the present disclosure, FIG. 2 shows a block diagram of a Compressive Sensing based Bio-Inspired Shape Feature Detection CMOS Imager integrated circuit (IC) with on-chip processing using 0.18 um CMOS technology for recognition of predetermined targets, tracking of recognized targets, and adaptive feature detection of new features of dynamic targets. The embodiment presented in FIG. 2 is capable of satisfying the soldier-centric imaging via computational cameras (SCENICC), a task defined by DARPA.

The presented system in hardware of FIG. 2 is capable of processing dynamic images from a nominal focal plane array with 1.2K×1.2K active pixels at a high frame rate (~1000 fps), under very low power (~0.50 Watts), and in a compact and lightweight package (e.g. order of gram (O(gram)) in weight).

The CMOS imager integrated circuit (IC) of FIG. 2 embodies enabling technologies from various contributions in the fields of compressive target detection architecture and hardware implementable compressive sensing recovery algorithm, bio-inspired visual systems and adaptive mechanism, low power hybrid multiplier, advanced CMOS imager, have enabled the high performance and low cost device represented in FIG. 2.

The Compressive Sensing based Bio-Inspired Shape Feature Detection CMOS Imager IC of FIG. 2 comprises five functional blocks (210, 220, . . . , 250). These functional blocks implement the following features:

Functional block (210), 1.2K×1.2K APS array, is a 1.2K× 1.2K (1200×1200 pixels) low power active pixel sensor (APS) array fabricated using 0.18 um CMOS technology;

Functional block (220), bio-inspired shape features compressive projection matrix, stores a novel compressive projection matrix and performs a delta modulation algorithm to detect edges of an image. The novel compressive projection matrix and architecture is based on bio-inspired shape features of targets [see refs. 5-7, incorporated herein by reference in their entirety] for high fidelity target detection and tracking; hence a new detected feature of an object can be easily adapted (e.g. stored in an MDAC array [see ref. 9, incorporated herein by reference in its entirety]) in the compressive projection matrix if allowable (e.g. if sufficient memory space is available in the MDAC array). In turn, this allows to expand the knowledge base on targets of interest and facilitate subsequent detection.

Functional block (220) further includes a novel architecture integration of read-out [see ref. 8, incorporated herein by reference in its entirety] from the APS (210) for delta modulation to achieve edge detection and sparse data representation of an input image, integrated with low power programmable 8-bit hybrid MDAC array [see ref. 9, incorporated herein by reference in its entirety] used to implement the compressive projection matrix, to enable compressive image (e.g., ~100×100 array) generation;

Functional block (230), compressive sensing (CS) sampling data array, includes an A/D converter array to convert analog signals obtained from edge detection (e.g. through functional block (220)) to digital signals and store a corresponding compressive sensing image sample. Functional block (230) also provides a data interface to a display (e.g. a goggle), where a full recovery image (1.2K×1.2K) with identified targets can be reconstructed;

Functional block (240), adaptive target extraction, includes an adaptive mechanism [see refs. 5-7, incorporated herein by reference in their entirety] to on-chip extract new features of changing (e.g. with respect to time) identified targets (e.g. dynamic targets) autonomously and to use the adapted new features to enrich its knowledge. Detected new features of an identified target by the functional block (240) can subsequently be stored (e.g. as an added projection vector) into the compressive projection matrix of the functional block (220) and used for subsequent target detection; and Functional block (250), target detection and location, performs the task of target detection and location based on correlation, location and size data provided by the functional block (220). Identified targets (e.g. data with correlation value higher than a minimum preset value) and related location/size data is stored for subsequent flagging/highlighting in the reconstructed image (e.g. as displayed in a goggle).

It should be noted that the functionality of each block as described in the previous section is implemented in hardware such as to obtain the IC of FIG. 2. Although the embodiment according to FIG. 2 represents a single IC, in some embodiments according to the present disclosure the hardware used may be a plurality of individual ICs such as to partition the overall functionality of FIG. 2 into the individual ICs. The skilled person should know of many ways to perform such partitioning given the teachings according to the present disclosure.

In the embodiment presented in FIG. 2, the 1.2K×1.2K APS array sensor of the functional block (210) is used to collect an image (e.g. an original image, or an image in the original space) for detecting predetermined targets. Reading of the entire pixels of the APS array is performed, for example, by dividing the APS array in non-overlapped 2-dimensional (2-D) sub-windows of a same given size (e.g. (n×n) pixels, where n can be for example 100) and then reading each sub-window sequentially, where each pixel of each sub-window is represented by a corresponding analog voltage. A sample of the image is read out via a 2-D sub-window of the non-overlapped 2-D sub-windows from the functional unit (210) by the functional unit (220).

The functional block (220) uses a novel parallel architecture to project, in a fully parallel fashion, the sample image, obtained by the 2-D sub-windows, onto a set of target bio-inspired features simultaneously using the projection matrix. A representation of the target bio-inspired features being stored into the projection matrix (e.g. as vectors stored in the MDAC) of the functional block (220). The projection matrix includes a plurality of projection vectors, each associated to a bio-inspired feature, and projection of the sub-window is performed simultaneously onto the plurality of projection vectors. Delta modulation of the projected data is then performed to edge detect the features of the sample image. Compressive sensing data, also referred to as data (e.g. image) represented in the CS space as opposed to the original image represented in the original space, obtained through these two steps (projection and delta modulation) is routed to the functional block (230) to be stored in digital form. Also, correlation values of the sample image in compressive space (e.g. wherein represented by CS data, see Appendix D) to the target bio-inspired features obtained through the projection matrix, as well as location and size references of the sample image is sent to the functional block (250) for further processing.

In the functional block (250), correlation values (e.g. as obtained via the projection matrix) between the 2-D raw data (e.g. an original image from an n×n sub-window) from the APS sensor and the bio-inspired features are evaluated and the maximum correlation value and associated location/size are obtained in compressive space and then translated in original space. If the maximum correlation (e.g. minimum phase distance) value detected in the original space is larger than a preset value, then a potential target is declared detected/identified/recognized. Detected target identity and position is then routed from functional block (250) to functional blocks (230) and (240). Functional block (230) will use this information to send detected target and position data to a display (e.g. a goggle), whereas functional block (240) will use this information for potential target adaptation, wherein new features of the detected target are gathered.

When a potential target is identified in the functional block (250), related target information (e.g. position and size values) is sent to the functional block (240). In turn the functional block (240) will extract the evolving (e.g. changing) features of the identified target by reading/tracking corresponding feature data (e.g. changing pixels) from the functional block (210) and send those feature data to the functional block (220) where these may be stored as adaptive features in the bio-inspired projection matrix (e.g. MDAC as vectors of the projection matrix), and used to facilitate subsequent detections. In its initial state, the projection matrix is fixed, meaning that it may include a limited number of vectors for initial target detection. As targets are detected, more information about the targets and their evolving features are detected and stored as adaptive features (e.g. projection vectors) in the projection matrix. When the adaptive features fill the entire MDAC array, there is provision to remove unused and/or less used features from the array (e.g. corresponding to consistent low correlation values). Therefore, the projection matrix adapts to the dynamic image presented to the functional block (210).

The technical approach presented in the embodiment of FIG. 2 enables to achieve ~1000 frames/sec (frs/sec) due to reduced processing requirements provided by the architecture of the feature projection matrix (linear coding) and usage of non-overlapped sub-windows (e.g. n×n pixels in size). The embodiment according to the present disclosure represented by FIG. 2 also allows for a reduced power consumption (~500 mWatts) due to a lower number of samples required in compressive measurement (where typically A/D measurement is power hungry in a CMOS imager), a reduced processing and hardware requirement (order of gram in weight), and a high quality image in low light and high noise environment to enable better target detection and tracking capability.

In particular, the technical approach used in the embodiment of FIG. 2 uses the following technologies:

A hardware-friendly recovery algorithm, namely mutual correlation [see ref. 10, incorporated herein by reference in its entirety], to enable the on-chip processing for reconstruction of a full quality image from compressive sensing data, which allows for fast processing and low power due to on-chip processing. Additional information is available in Appendix D.

Bio-Inspired Shape Feature Extraction (BSFE) [see refs. 5-7, incorporated herein by reference in their entirety]

feature, which emulates the integration of the saccadic eye movement and the horizontal layer in the retina of a vertebrate. This is a novel and powerful bio-inspired technique [see refs. 6 and 7 incorporated herein by reference in their entirety] which allows to enhance detection of dynamic objects in a heterogeneous environment. Additional information is available in Appendix E.

Feature Extraction Algorithm (FEA) [see ref. 11, incorporated herein by reference in its entirety] enables adaptive capability and realtime salient feature extraction to unambiguously identify dynamic objects.

Low power CMOS imagers [see ref. 3, incorporated herein by reference in its entirety].

2-D sub-window read out technique which enables parallel processing in the on-chip computation [see ref. 8, incorporated herein by reference in its entirety].

Low power, compact, analog-digital hybrid multipliers to enable a parallelized processing and simple architecture [see ref. 9, incorporated herein by reference in its entirety]. Additional information is available in Appendices A, B and C.

In one embodiment according to the present disclosure, the CMOS imager IC of FIG. 2 can be used to provide a computational camera, which seamlessly integrates the computational imaging capabilities provided by the unique methodology of compressive sensing, neural network based BSFE, and FEA algorithms adapted for in-situ learning. Such computational camera may include additional elements, such as lenses and a display, which in combination with the CMOS imager IC can provide a desired functionality. The skilled person will require no additional information on how to use the novel CMOS imager IC according to the present disclosure to implement a computational camera.

According to another embodiment of the present disclosure, the computational camera is implemented using very-large scale integration (VLSI) hardware, and/or micro-electromechanical systems (MEMS) hardware. Such an embodiment enables real time adaptive target detection and tracking in a computational cameras for usage in, for example, ultra-low size, weight, and power (SWaP) persistent/multi-functional soldier-scale ISR (Intelligence, surveillance, and reconnaissance) systems. The skilled person will understand that the CMOS imager IC of FIG. 2 may independently (e.g. from a computational camera) be implemented using VLSI technology and/or any current high density IC manufacturing technique as fit for a specific design and implementation.

The uniqueness of the computational camera implemented in VLSI hardware and/or MEMS according to the present disclosure lies in the (a) high speed, low power and adaptive bio-inspired custom-hardware implementation of a novel compressive architecture in analog VLSI seamlessly integrated with (b) low power 8-bit hybrid memory-digital-analog-converter (MDAC) used to store a projection matrix ($\Phi$) (e.g. using linear coding) based on the bio-inspired shape features of targets stored in digital format, to enable low power and high speed computation (e.g. via parallel projection and CS) required for real-time target detection and tracking at higher speed (e.g. 1000 frs/sec) and reconstruction of the image stream at higher speed (e.g. 30 frs/sec).

According to another embodiment of the present disclosure, the computational camera implemented in VLSI and/or MEMS includes, by virtue of usage of the CMOS imager IC of FIG. 2, a hardware implementable recovery algorithm, namely Mutual Correlation [see ref. 10, incorporated herein by reference in its entirety], to recover the original sensing (e.g. collected) image from compressive image under limited bit constraints (e.g. 8-bit quantization). This algorithm enables the simplification of the processing required for image recovery while being a robust recovery algorithm, attributes which allow the hardware implementation of such computational camera.

The computational cameras presented above thus includes the following novel features, which are included in the CMOS imager IC of FIG. 2:

Bio-inspired shape features for compressive projection matrix and a corresponding architecture for target detection and adaptation;

Parallel tasks of edge detection and compressive projection with 8-bit low power hybrid MDAC to enable fast processing, low power and compact approach;

Integration of active pixel sensor, compressive sensing technique, bio-inspired compressing target detection and tracking architecture to enable robust detection of dynamic target and tracking in the dynamic and ambiguous environment, to enhance speed performance while reducing the power consumption, such as to meet, for example, the constraints of SWaP.

When implemented in a computational camera, as for example per the various embodiments presented above, these innovative technologies allow to achieve DARPA's goal for the SCENICC task, as defined for example in DARPA's solicitation number DARPA-BAA-11-26, released Dec. 22, 2010 and incorporated herein by reference in its entirety.

Traditionally, sensing photon and measurement are identical steps; however, CS has established a new mathematical foundation of recovery [see refs. 1, 12-15, incorporated herein by reference in their entirety] such as to enable sensing photon and measurement separately to obtain quality data despite insufficient photon (low light condition) or noisy environment, and to enhance speed performance and to reduce power consumption due to less sample data to collect and process; specially in target recognition research when the mapping manifold from un-compressive to compressive dimension is smooth and stable [see ref. 2, incorporated herein by reference in its entirety]. Hence, this established mathematical foundation allows one to work in compressive space and un-compressive space interchangeably and without loss of performance quality.

The enabling technologies of the Compressive Sensing based Bio-Inspired Shape Feature Detection CMOS Imager of the embodiment presented in FIG. 2 is based on:

Two hardware components: low power, low cost CMOS active pixel sensor [see refs. 3 and 16, incorporated herein by reference in their entirety], and 8-bit Low power hybrid MDAC [see ref. 9, incorporated herein by reference in its entirety];

Full parallel 2-D sub-window read-out [see ref. 8, incorporated herein by reference in its entirety] and parallel high speed and low power edge detection and bio-inspired feature based projection matrix [see refs. 5-7, incorporated herein by reference in their entirety];

Real time adaptive bio-inspired shape feature extraction engine based on principal component analysis (PCA) for new feature adaptation [see refs. 5-7 and 11, incorporated herein by reference in their entirety]; and Hardware friendly recovery algorithm, mutual correlation (MC) [see ref. 10, incorporated herein by reference in its entirety], to reconstruct full images.

According to some exemplary embodiment of the CMOS imager of FIG. 2, the hardware implementation may comprise a CMOS Active pixel sensor (APS cell) and an 8-bit low power Hybrid Memory-Digital-Analog-Converter (MDAC) as described below:

Active pixel sensor (APS)

Hardware sensors based on the APS technology (e.g. CMOS camera) have the advantages of low cost of manufacturing, low power consumption, and being based on low cost conventional CMOS based manufacturing technology. Further details regarding the APS technology and associated benefits can be found in Appendix A.

8-bit low power hybrid memory-digital-analog-converter (MDAC)

The 8-bit low power MDAC used in the various embodiments according to the present disclosure is a powerful basic component of work performed in neural network [see refs. 18 and 19, incorporated herein by reference in their entirety]. In the commercial arena, the 8-bit MDAC was used to develop a smart camera where a 128×128 RGB APS photo array and a neural network processor were successfully integrated on-chip for food quality detection by intelligent optical systems [see ref. 4, incorporated herein by reference in their entirety]. Working details of the 8-bit low power MDAC is presented in Appendix B.

In the embodiment of FIG. 2, combining the edge detection and the bio-inspired shape feature compressive projection matrix allows for enhanced processing of the acquired image data as well as a reduced size and power consumption of the corresponding hardware.

The edge detection technique used in the embodiment of FIG. 2 has the advantages of providing a sparse data representation of an acquired image, and using a set of bio-inspired related targets for detection [see ref. 12, incorporated herein by reference in its entirety]. A mathematical model for this edge detection technique used in the embodiment of the FIG. 2 is provided in Appendix C.

According to some exemplary embodiments of the present disclosure, different edge detection techniques for sparse data (e.g. image) may be used in the various embodiments presented in this disclosure. In one embodiment according to the present disclosure, Hadamard wavelet transforms may be used to extract an image's edges. In yet another embodiment according to the present disclosure, principal features of an object within an image may be extracted using a second order statistical technique such as, for example, the principal component analysis (PCA) technique. According to yet another embodiment of the present disclosure, Hadamard wavelet transforms and PCA may be used in combination. These techniques are well known to the skilled person, who may find alternate suitable methods for the various embodiments of the present disclosure.

Figure 3:
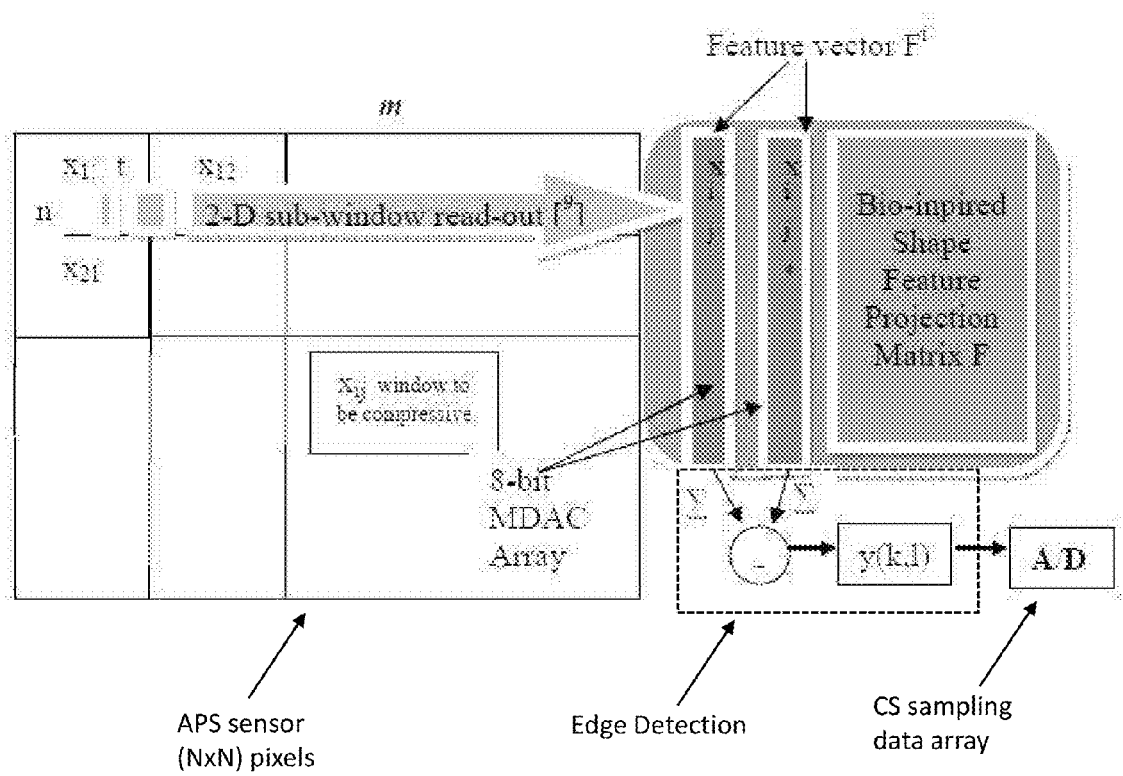
FIG. 3 shows an exemplary building block of a parallel readout from an imaging sensor and feeding of the readout to a projection matrix used in the embodiment of FIG. 2.

FIG. 3 shows generation of the compressive data as used in the various embodiments of the present disclosure. Generation of the compressive data includes edge detection and bio-inspired feature projection vectors. According to the embodiment of FIG. 3, mapping from a two-dimensional (2-D) analog sub-window to a one-dimensional (1-D) input vector to a projection matrix (e.g. composed of row vectors F'), for a fully parallel processing [see ref. 8, incorporated herein by reference in its entirety] is provided. According to the embodiment of FIG. 3, the 2-D analog representation of pixels ($x_{ij}$) of a first 2-D sub-window and pixels ($x_{ij*}$) of a second non-overlapping 2-D sub-window, can be read-out from the image sensor (m) (e.g. APS sensor of (N×N) pixels size) in a fully parallel fashion. Each element of the 1-D input vector represents a sub-pixel voltage (e.g. as generated by the APS cell described in Appendix A) and is fed to an input (Vin) (e.g. associated to a projection vector) of the 8-bit MDAC projection matrix composed of digital values corresponding to the element values of the target features, resulting in an output current ($I_{out}$). According to the embodiment depicted in FIG. 3, resultant outputs (e.g. current (Iout)) for neighboring sub-windows are used to generate the edge detected features (y(k,l)) for storage as compressive sensing data into the CS data sampling array (230) of FIG. 2. As the MDAC projection matrix contains a plurality of projection vectors, parallel projection onto these vectors is performed by feeding the 1-D input vector obtained from the 2D sub-window simultaneously to all inputs (Vin) associated to each of the projection vectors. More information regarding this hybrid (e.g. analog values of sensed pixels multiplied to digital values of the projection matrix) projection method can be found in Appendix B and [see refs. 8 and 9, incorporated herein by reference in their entirety]. It should be noted that although in this embodiment the 2-D sub-windows are selected such as to correspond to non-overlapping and possibly adjacent pixel regions of the APS sensor, in some embodiments the sub-windows may be selected such as to straddle one another's boundaries.

According to a further embodiment of the present disclosure, a method is provided to overcome a discontinuity of target detection based on features of a potential target which may lie across non-overlapping sub-window neighbors (e.g. non smooth input space). In order to compensate for this discontinuity, a target feature is represented in the projection matrix by a plurality of shifted (e.g. pixel by pixel) representations across the non-overlapping input sub-windows. In some embodiments according the present disclosure the target feature may be represented by all of its possible shifted representations across the non-overlapping input sub-windows. The skilled person will appreciate the novelty of this technique over a traditional convolution technique used in prior art, where a raster of sub-windows of an input image pixel by pixel is used to find the best correlation match between sub-window inputs and a target features, as opposed to the embodiment according to the present disclosure where non-overlapping sub-window inputs are used to find the best correlation with rastering target features.

For a case of a traditional APS readout where a single pixel is read at a time, only the information pertaining to the amount of photons received by the area (Ar) of each pixel can be obtained at each readout cycle. In contrast, and according to the various embodiments of the present disclosure, when using the CS technique and due to the associated parallel readout technique, information pertaining to the amount of photons corresponding to a sub-window of size, for example (m×m) pixels, can be collected at each readout (e.g. due to parallel readout); hence the CS technique according to the various embodiments of the present disclosure allows to collect image information based on photon collected on a ($m^2 \times$ Ar) area as opposed to an area (Ar) for the traditional single pixel per readout cycle. Thus, the CS technique provides $m^2$ times the information a single pixel readout technique provides. This implies that more photons can be collected per unit of time using the CS technique, which in turn allows for a clearer image. Furthermore, since data readout from the sensor is sampled digitally, in the case of the various embodiments according to the present disclosure where a CS technique is used, m×m pixels can be sampled with a single measurement, while a traditional technique requires $m^2$ measurements to sample the same amount of pixels. This in turn allows more integrating time and less noise when using the CS technique according to the various embodiments of the present disclosure. Given the above, the skilled person will appreciate the advantages of using any image sensing technique based on the same configuration provided by the CS technique.

As described in the previous section, CS enables quality image from less data sampling (less measurement) and/or more integrating time. Thus a CS based hardware system such as presented in the various embodiments of the present disclosure requires less memory and allows for faster processing, with a net benefit of lower cost due to less processing time and lesser power consumption due to lower sampling rate. These benefits can be attractive parameters in many applications, such as, for example, DARPA's future applications for UAV.

A challenge for object recognition based on compressive sensing is that the convolution technique, as known by the person skilled in the art, is no longer valid due to each pixel being sampled only one time in an ambiguous form of linear coding (projection matrix). Therefore, matching of a compressive searched object in the spatial domain (e.g. original space) is no longer available, hence the database object has no mathematical support and the spatial location of a found object cannot be decoded due to compressive data without pixel location information. According to an embodiment of the present disclosure, this challenge is removed by providing location information (and size) of the sampled data (e.g. for each 2-D sub-window read) to the target detection and location functional block (250) of FIG. 2 for later processing, where location information is used to reference the CS data stored in the functional block (230) of FIG. 2 as well as in the functional block (240) for tracking of an identified target. More information on the convolution technique and location tagging as used in the embodiment of FIG. 2 is provided in Appendix D.

Figure 4:
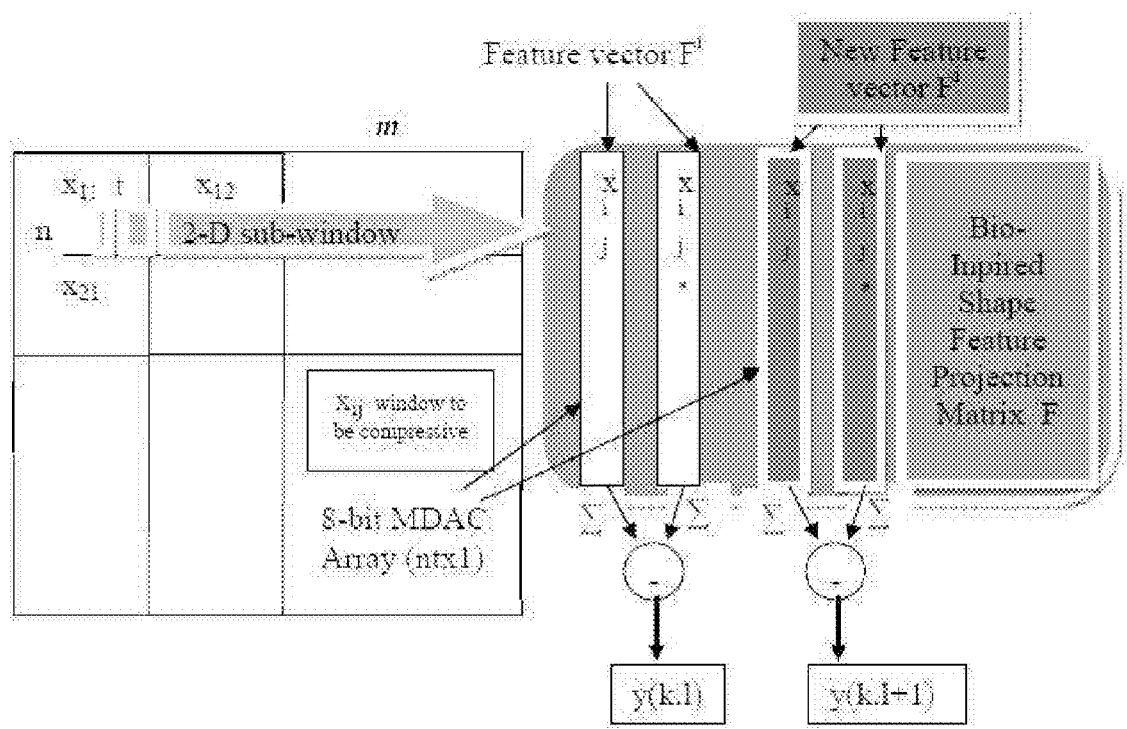
FIG. 4 shows an exemplary building block of an adaptive feature of the projection matrix used in the embodiment of FIG. 2, wherein a newly detected feature of a target in stored in the projection matrix.

In the dynamic environment, wherein time varying moving images are presented to the image sensor, the detected target is not the same as it is known (e.g. features stored in the compressive projection matrix (220) of FIG. 2) and is changing in time as well. According to an embodiment of the present disclosure, adaptation to newly detected features of a target helps to identify and track the target in an enhanced and effective manner. FIG. 4 shows the updating of the compressive projection matrix (e.g. functional block (220) of FIG. 2) with a New Feature (projection) vector ($F^i$). This new bio-inspired feature projection vector is subsequently used as a projection vector for any newly acquired image from the sensor. As depicted in the embodiment of FIG. 2, the newly detected features and derivation of a corresponding projection vector is performed by the functional block (240). When a target is detected, new features are extracted and added adaptively to the projection matrix as shown in FIGS. 2 and 4. More detailed information regarding dynamic object recognition and tracking based on bio-inspired technology is provided in Appendix E and [refs. 5-7, incorporated herein by reference in their entirety].

As known by a person skilled in the art, several CS recovery algorithms are available [see refs. 1 and 12-15, incorporated herein by reference in their entirety], which are not necessarily designed to be hardware friendly such as to enable on-chip recovery of an image based on the available CS data (e.g. corresponding to a scanned/collected image). The embodiment according to FIG. 2 is provided by recognizing the hardware limitation that an inadequate CS recovery algorithm can impose and accordingly a novel hardware friendly CS recovery algorithm, namely mutual correlation (MC), is used. More information regarding MC can be found in Appendix F and [ref. 10, incorporated herein by reference in its entirety]. Such hardware-friendly CS recovery algorithm is an important building block for enabling the on-chip recovery of the image based on the CS data of the embodiment presented in FIG. 2.

According to the various embodiments presented in this disclosure and the supporting Appendices and References, a CMOS imager IC using innovative architecture, hardware friendly algorithms and high performance components is presented.

The person skilled in the art of information, communication and/or coding theory will know how to apply the mentioned techniques, algorithms, computations and building blocks presented in this disclosure, including in the various Appendices and References, to the implementation of the disclosed methods and devices, including the CS based bio-inspired shape feature detection CMOS image IC. The skilled person may also find different hardware implementations and/or hardware partitioning for implementing the various presented techniques, algorithms, computations and building blocks to obtain an imager IC with substantially same qualities as disclosed in the present disclosure. Finally, the skilled person may implement such hardware in an IC fabricated using manufacturing technologies other than the discussed CMOS technology.

The examples set forth above are provided to give those of ordinary skill in the art a complete disclosure and description of how to make and use the embodiments of the distributed Reed-Solomon codes for simple multiple access networks of the present disclosure, and are not intended to limit the scope of what the inventors regard as their disclosure.

Such embodiments may be, for example, used within computer science and communication fields with applications in distributed storage in cloud computing, network file distribution and wireless key pool bootstrapping where error free reconstruction of a set of original files is the goal. The skilled person may find other suitable implementations of the presented embodiments.

Modifications of the above-described modes for carrying out the disclosure, including pressure control devices, accumulators, and so forth, may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

APPENDIX A

Active Pixel Sensor (APS)

Figure 5:
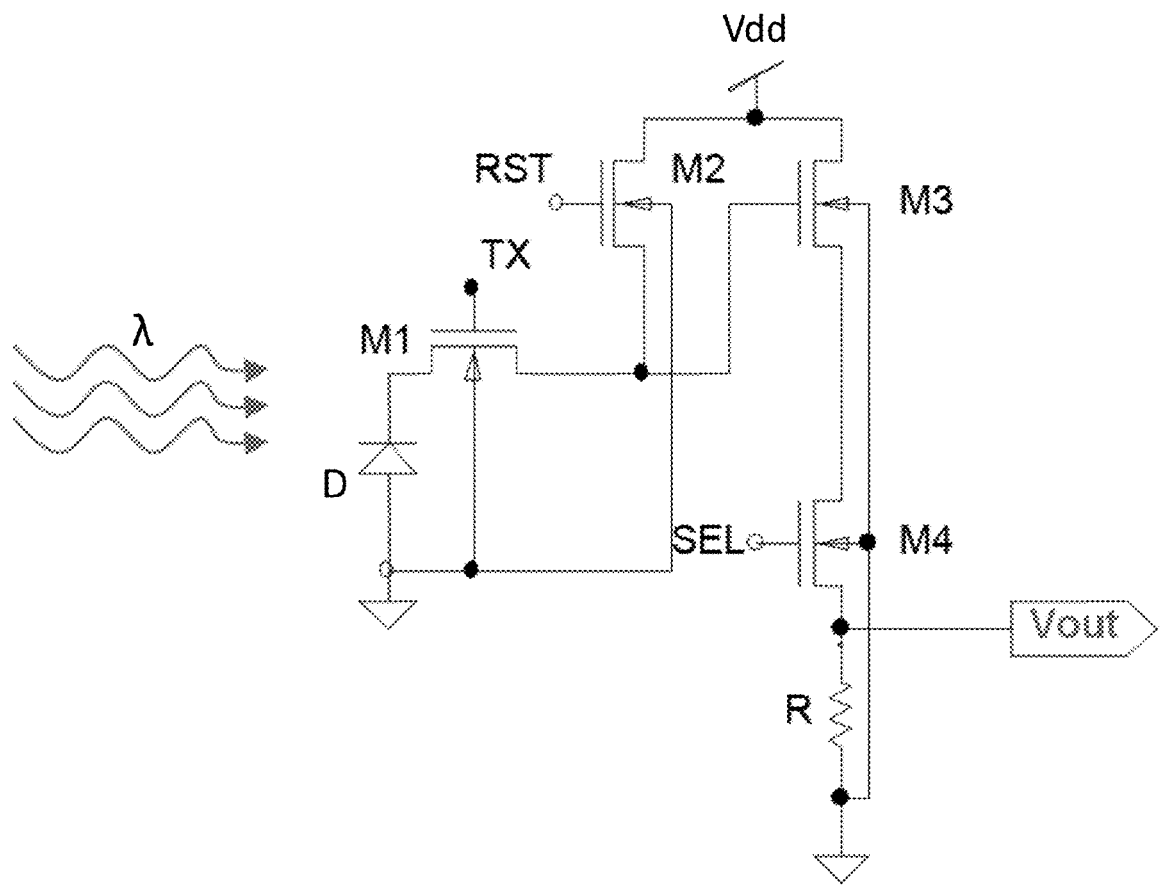
FIG. 5 shows an exemplary embodiment of a pixel design used in an active pixel sensor (APS) array of the embodiment of FIG. 2.

FIG. 5 shows the design of a pixel in an APS sensor. The APS cell shown in FIG. 5 has a low power consumption, mainly due to its low voltage operation (e.g. less than 5V), as compared with a counterpart charged-coupled device (CCD) technology. The noise output (e.g. as evaluated by a signal to noise ratio) of an APS sensor (e.g. APS cell) is higher than that of a CCD sensor; however, CS approach will enable an increase in the quality of an APS detected image due to the usage of the optical point spread function (PSF) engineering solution [see ref. 21, incorporated herein by reference in its entirety], as well as operation in low light condition where the number of photons is insufficient for a conventional camera, by increasing the number of photons read per single readout cycle.

In the APS cell (e.g. one pixel) circuit of FIG. 5, initially the (RST) signal is set to a high level to charge up the capacitor of the gate (M3) to a voltage (Vdd-Vth), where Vth is the threshold voltage of the transistor (M3). For the integration phase, the photo diode (D) is bombarded with the photons ($\lambda$) to generate the minority carrier current which flows through transistor (M1) (with the control voltage TX at the gate of (M1) set to 'HIGH') to remove the charges in the gate of (M3), when the (RST) signal is low. The amount of removed charge is based on the level of minority carrier current which is proportional to the number of photons hit on the photogate or photodiode and the integration time. With the signal (SEL) is set to 'HIGH', the voltage (Vout) at the output of the APS cell is determined by the combination of the resistor (R) and the integration charge left at the gate of (M3) which controls the current flowing through M4. Finally, the pixel value is calculated as follows:

$$V_{pixel} = V_{p\_RST} - V_{p\_out}$$
$$\text{where} \begin{cases} V_{p\_RST} = V_{out} & \text{with } RST = \text{'1'} \\ V_{p\_out} = V_{out} & \text{with } RST = \text{'0'} \end{cases}$$

APPENDIX B

8-Bit Low Power Hybrid Memory-Digital-Analog-Converter (MDAC)

In the computational camera, 8-bit MDAC plays important role as multiplier between analog pixel sensing data (Vin) and projection matrix value in represented by a digital word (D0-D7), and its result (e.g. of the multiplication) in current can be summed up to a current (Tout) through a piece of metal. This feature known as hybrid technique is considered an advantageous choice as compared to an all digital technique or to an all analog technique with the advantages of providing sufficient learning/adaptive performance, low power consumption, and enhancing the a target hardware architecture for a practical size allocation.

Figure 6:
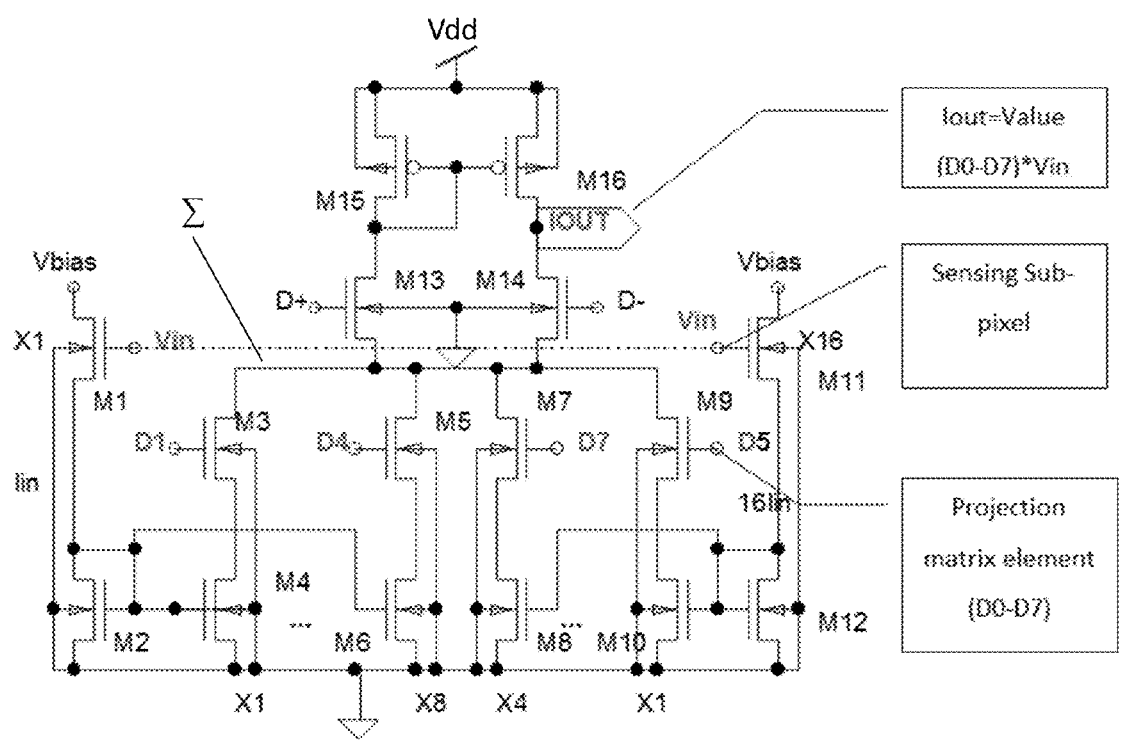
FIG. 6 shows an exemplary circuital representation of a hybrid multiplication technique used in the embodiment of the FIG. 2.

FIG. 6 shows an exemplary circuital representation of the design used to implement said hybrid multiplication technique. Basically, the 8-bit MDAC weight is served as a multiplier between an input signal (Vin) corresponding to a sensed pixel value, and a weight value (Dn), with a resulting multiplication output ($I_{out}$) being summed with previous multiplication results (e.g. corresponding to other sensed pixels captured within an input array) before performing any other operation like subtraction for edge detection etc.

In the design represented in FIG. 6, the projection matrix element ($F_{ij}$) is represented by a set of digital numbers and stored into a static random-access memory (SRAM) represented by a digital word output ($D_1$-$D_7$), and the signal input (Vin) is converted into currents ($I_{in}$) and ($16*I_{in}$) for reducing space in the design. The multiplier is used to multiply the ($F_{ij}$) and ($I_{in}$) and its result in current mode is ($I_{out}$).

As digital ($F_{ij}$) is written into SRAM array and ($I_{in}$) is available, multiplication is accomplished by conditionally scaling the input current ($I_{in}$) by a series of current mirrors transistors (e.g. ((M3,M4), (M5,M6) . . . ). For each current mirror, a pass transistor (e.g. M3, M5 . . . ) controlled by one SRAM bit (e.g. D1, D2, . . . ) allows current to be conditionally placed on a common summation line ($\Sigma$). The SRAM bits in the digital word from least-significant-bit to most-significant-bit are connected to 1, 2, 4, 8, . . . , 64 current mirror transistors respectively, so that the input current is scaled by the appropriate amount. Looking at FIG. 6, the conduction path associated to SRAM bit (D1) and defined by transistors (M3, M4), multiplies input current ($I_{in}$) by one, and conduction path associated to SRAM bit (D4) and defined by transistors (M5, M6, not all transistors shown) multiplies input current ($I_{in}$) by eight. To reduce the number of current minor transistors (the total is 127 transistors to be mirrored) for space and speed due to gate capacitances of mirror transistors, the seven digital bits are divided into two subgroups: a first subgroup for the first 4-bit and second subgroup for the last 3-bit. Each of the two subgroups is provided a different input current: ($I_{in}$) for the first subgroup and ($16*I_{in}$) for the second subgroup. As such, a total of 15 transistors are to be mirrored by ($I_{in}$) and 7 transistors are to be mirrored by ($16*I_{in}$) (e.g. 1+2+4+8=15 and 1+2+4=7), instead of the 64 transistors required without subgrouping. The resulting summation current is unipolar. However, a current steering differential transistor pair (M13, M14), controlled by the eighth bit (e.g. bit D0) of the digital word (e.g. D+/D− of FIG. 6), determines the direction of the current output ($I_{out}$), such that a two-quadrant multiplication is accomplished (−127 to 127 levels). More detailed information regarding this hybrid multiplication technique can be found in [see ref. 9 incorporated herein by reference in its entirety].

Figure 7:
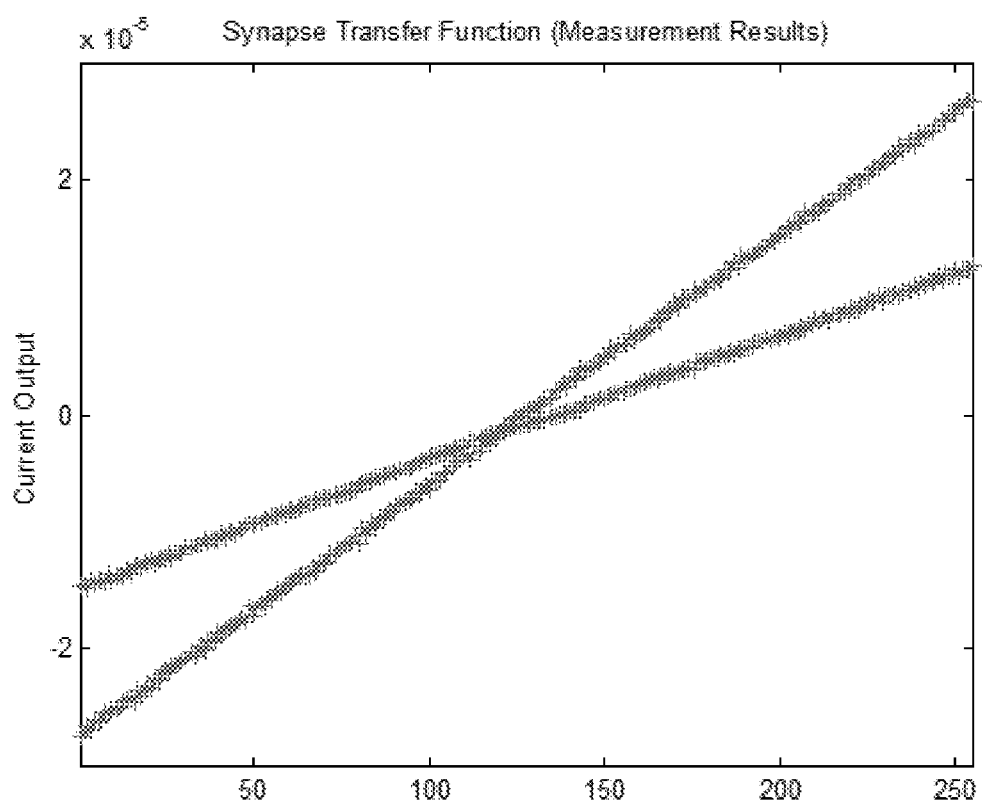
FIG. 7 shows an input/output relationship of the hybrid multiplier of FIG. 6 for two different inputs.

To test this cell, the inventors used an input current ($I_{in}$) with two different values (e.g. 2 µa and 4 µa), and for each current input value, we change the digital value (e.g. D1, D2 . . . ) from 0 to 255 with MSB serving as sign bit (e.g. 1 is corresponding to −127, 128 as 0 and 255 as 127). The measurement results are collected and shown in FIG. 7. These results show excellent linearity as expected by a corresponding SPICE simulation.

APPENDIX C

Edge Detection Model, Namely Principal Component Analysis (PCA):

Let X(m,n) be a sub-window in location index m row and n column, and $F^k$ be a bio-inspired shape feature of a target $S^k$, where m takes a value from $\{1 \ldots M\}$; m=$\{1 \ldots M\}$, and n takes a value from $\{1 \ldots N\}$; n=$\{1 \ldots N\}$.

Edge detection is governed by the following equation:

$$x_{ij}(\text{edge}) = x_{ij} - x_{ij+1}$$

where i=$\{1 \ldots n\}$ and j=$\{1 \ldots t\}$
n indicates row index of non-overlapping sub-windows
t indicates column index of non-overlapping sub-windows The compressive data is then represented by:

$$Y(k,l) = \sum_{i=1}^{n}\sum_{j=1}^{t} F^k * x_{ij}(\text{edge}) = \sum_{i=1}^{n}\sum_{j=1}^{t} F^k x_{ij} - \sum_{i}^{n}\sum_{j}^{t} F^k x_{ij+1}$$

Simulation of the edge detection model shown above was performed and a corresponding input and output are shown in FIGS. 10A and 10B, respectively. The results indicate that the presented edge detection model provides sparse data which is sufficient for object recognition.

APPENDIX D

Compressive Convolution Technique Based on Feature Space for Locating Potential Target Positions in Original Image Frame Let $X=[x_{ij}]$ be a sample 1-D vector of dimension (nt×1) of sensing data of which can be sensed from 2-D pixel array of dimension (n×t) in position (i,j) of a compressive sensing array in analog domain. An exemplary mapping from 2-D to 1-D in silicon is described in [see ref. 8, incorporated herein in its entirety].

let $\Phi$ be a projection matrix (nt×m) and Y (m×k) be a compressive vector.

We can write the relationship between vectors Y and X as follows:

$$Y = \Phi^T X \text{ with } \|X\|=1$$

Traditionally, $\Phi$ is obtained through a random set or an orthogonal set and the recovery estimate $\hat{X}$ can be exact as X [see refs. 1 and 2, incorporated herein by reference in their entirety].

For target detection, we have used $\Phi$ as feature vector array of an interested object. The feature we have used is based on bio-inspired feature which is extracted from a statistical data set of the saccadic eye movement samples [see ref. 5, incorporated herein by reference in its entirety].

Let features of an interested object s in database be $F^s=[f_1^s \ldots f_k^s]$ with $f_1^s$ (n1×1) and $\|f_i^s\|=1$ where k is the number of spatial features of the interested object s.

$\Phi=[F^1 \ldots F^h]$ where h is the number of interested objects

Y becomes the correlation between the interested objects and a searched object.

The maximum correlation of Y is $(f_{k1}^{i1})^T x_{ij}$ where the position of the object in the image can be decoded from i, j, and where k1 and i1 represent the identified object label.

The upper left corner position of an identified object in the scene is:

$$x1 = i*t + \text{rem}(k1,t)$$

$$y1 = j*n + \text{fix}(k1/t)$$

A traditional convolution technique requires (N−n)*(M−t) correlation matching of sub window (n×t) while the convolution of a compressive image only requires (N/n)(M/t) correlation matching and the spatial between adjacent window is identified by pre-extracted spatial feature. The logic for this is that the compressive recognition of the interested objects will be much faster than the traditional one due to all the features that are pre-extracted.

The presented compressive convolution technique is considered as one stone kills two birds since the projection matrix and features of an object can be combined to provide a hardware implementation with reduced power consumption and reduced hardware layout space.

Figure 8A:
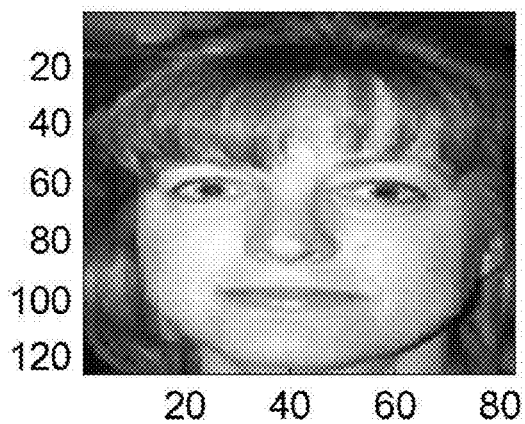
FIGS. 8A and 8B show a target image and a corresponding bio-inspired shape feature representation respectively.
Figure 8B:
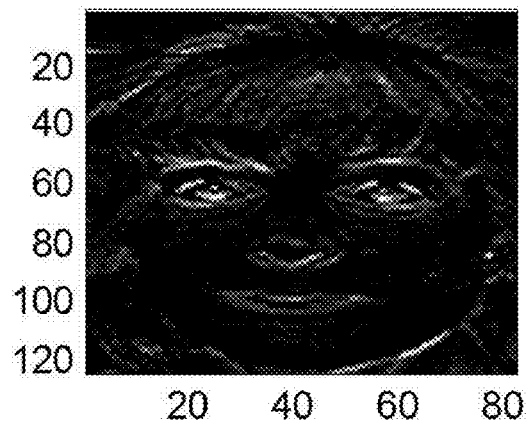
Figure 9A:
FIG. 9A shows detected image using a bio-inspired compressive recognition algorithm used in the embodiment of the FIG. 2 and based on an input compressive feature such as presented in FIG. 8B.
Figure 9B:
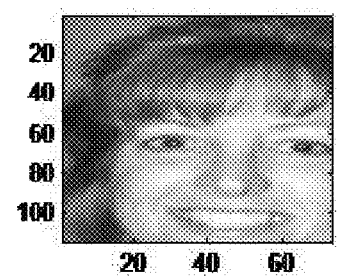
FIG. 9B shows a detected matching face of FIG. 9A.

Simulation Results:

In the database of 450 images, the image of FIG. 8B is extracted using bio-inspired shape feature approach [see ref. 5, incorporated herein by reference in its entirety] which is based on the saccadic eye movement to sample the image in different location. The collection of sampled image can be used to extract its feature based on the second order of statistical analysis namely principal component analysis. The process is repeated with different spatial location of target and all spatial features are stored as projection matrix. The image of FIG. 8A is among 450 images that are tested and the best match is found in FIG. 9A and the matching face is shown in FIG. 9B.

APPENDIX E

Dynamic Object Recognition and Tracking Based on Bio-Inspired Technology

The inventors recorded a video at a shopping mall in Southern California. The inventors used this application to demonstrate that the inventors' bio-inspired object recognition based on shape and color can be effective to recognize an interested person in the heterogeneous environment where the single technique e.g., shape or color, itself exposed its difficulties to perform effective recognition. Moreover, the video also demonstrates the mechanism and architecture of the autonomous adaptive system to enable the realistic system for the practical use in the future. For the first frame shown in FIG. 10A, a window is selected to include an object shown in FIG. 10B.

When the object is selected, it is extracted to obtain a shape feature associated to the object. For this application, only one bio-inspired shape feature has been used.

The initial knowledge of an object, such as shape of a face, is obtained and used to validate the new scene. When done, the architecture and feedback mechanism are applied for adapting a new feature of the moving and changing object.

Figure 11:
FIG. 11 shows the various video frames of a video sequence while highlighting/tracking the selected feature of FIG. 10B.

The sequences of the video and its recognition are shown in FIG. 11. This short video, represented by the various sequential frames in FIG. 11, contains the variation of the dynamics in heterogeneous environment and the person of interest has moved (e.g. from frame to frame) to show the rotation and scaling of his face in a changing background. This video represents a good test for our approach. More detailed information regarding the process of dynamic object recognition and tracking based on bio-inspired technology can be found in [ref. 5, incorporated herein by reference in its entirety].

APPENDIX F

Mutual Correlation (MC) Algorithm for Recovery of Image Based on Compressive Sensing Data A new objective function is developed, to enable a simple learning algorithm, named mutual correlation (MC) algorithm, which is mainly based on a simple gradient descent technique and its mathematical model is presented below.

A new objective function J is introduced, which is described below:

$$J = (\Psi^T y - \Psi^T \Psi \hat{x})^T \begin{bmatrix} 1 - \hat{x}^T \hat{x} \\ \ldots \\ 1 - \hat{x}^T \hat{x} \end{bmatrix}_{n \times 1} \quad (1)$$

-continued $$\text{With } \Psi(m \times n) = \begin{bmatrix} \varphi_1^T \\ \ldots \\ \varphi_m^T \end{bmatrix}$$

Where $\phi_i(n \times 1)$ is an arbitrary linear coding, where n>m, y is a measurement state, x and $\hat{x}$ are original and recovery vectors respectively.

From this analysis, the mutual correlation learning algorithm based on the gradient descent and momentum can be found:

$$\hat{x}(j+1) = \hat{x}(j) - \zeta \frac{\partial J}{\partial \hat{x}}(j) - \varepsilon \frac{\partial J}{\partial \hat{x}}(j-1)$$

Where $\zeta$ and $\varepsilon$ are learning rates. In this study, the inventors used the same learning rate for both which is $\zeta = \varepsilon$. We used the dynamic learning rate which is shown below:

$$\zeta(j) = r_0 \left(1 - \frac{j}{n\_iters}\right)$$

where j=1−n_iters

Simulation Results

Four benchmark data sets have been studied, and the simulation results are compared with state of the art technique Basis Pursuit (BP) with respect to Mean Square error (MSE) and CPU time.

Figure 12:
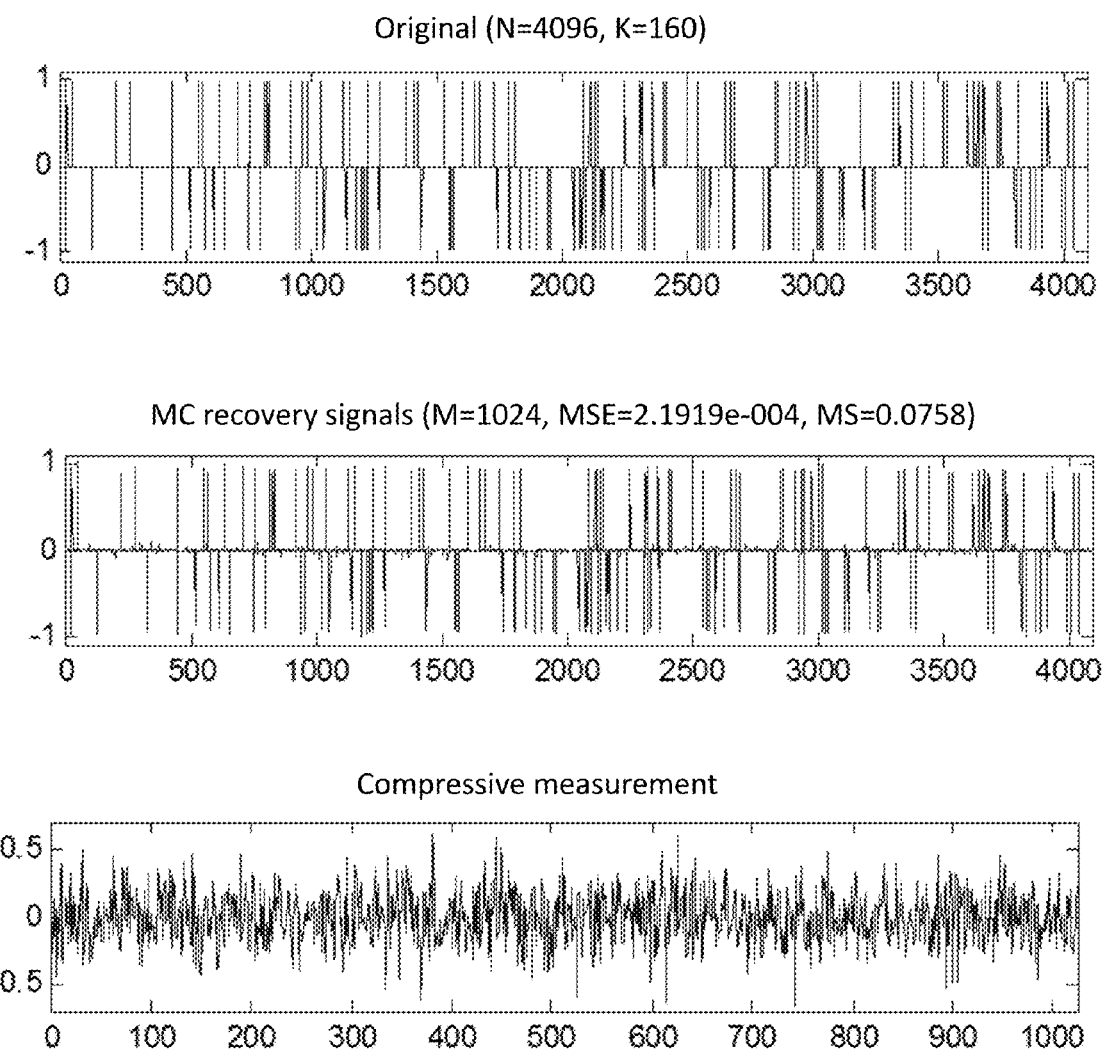
FIG. 12 shows various graphs representing the performance of a mutual correlation (MC) algorithm used in compressive sensing (CS) based image recovery task within the embodiment of FIG. 2.

FIG. 12 shows the simulation results for one of the four data sets. This set uses N=4096, M=1024 (compressive size), and K=160 (non-zero sparse) with random number +/−1 for each sparse value.

The top trace of FIG. 12 shows the expected recovery signal before compressive sensing, the middle trace of FIG. 12 shows the actual recovery signals using MC technique with relative error MS=0.0758; and the bottom trace of FIG. 12 shows a compressive signal that is used to reconstruct the middle trace.

Table 1 of FIG. 13 shows the tabularized results of the simulation for all four data sets. Of particular interest is the CPU time required by the MC approach, which is consistently lower than one required by the BP approach for a same performance in MSE.

More detailed information regarding the mutual correlation algorithm for compressive sensing reconstruction can be found in [ref. 10, incorporated herein by reference in its entirety].

LIST OF REFERENCES

[1] E. Candès, J. Romberg, and T. Tao, "*Robust uncertainty principles: Exact signal reconstruction from highly incomplete frequency information*," IEEE Trans. Inform. Theory, vol. 52, pp. 489-509, February 2006.
[2] Richard G. Baraniuk and Michael B. Wakin, "*Random Projections of Smooth Manifolds*," Proc. Int. Conf. Acoustics, Speech, Signal Processing (ICASSP), May 2006.
[3] E. Fossum, "*Low Power Camera-On-A-Chip Using CMOS Active Pixel Sensor Technology*," Proc. of IEEE Symposium on Low Power Electronics, San Jose, Calif., Oct. 8-10, 1995.
[4] E. Fiesler, S. Campbell, L. Kempen, and T. Duong. "*Color Sensor and Neural Processor on One Chip*."International Symposium on Optical Science, Engineering, and Instrumentation, Proc. of the SPIE, vol. 3455 'Applications and Science of Neural Networks, Fuzzy Systems, and Evolutionary Computation', pp. 214-221, 1998.
[5] Than A. Duong, Vu A. Duong and Allen R. Stubberud, "*Shape and Color Features for Object Recognition Search*," Handbook of Pattern Recognition and Computer Vision, Chap. 1.5, Ed. C. H. Chen, 4th Edition by World Scientific Publishing Co. Pte. Ltd, January 2010.
[6] U.S. Pat. No. 7,711,157.
[7] U.S. Pat. No. 8,340,435.
[8] T. A. Duong, "*MappingPixel Windows to Vectors for Parallel Processing*" NASA Tech Briefs, Vol. 20, No. 3, pp i1-i2, 1996.
[9] Than A. Duong, S. Kemeny, T. Daud, A. Thakoor, C. Saunders, and J. Carson, "*Analog 3-D Neuro-processor for Fast Frame Focal Plane Image Processing,*" The Industrial Electronics Handbook, Chap. 73, Ed.-In-Chief J. David Irwin, CRC PRESS, 1997.
[10] U.S. provisional patent application 61/406,483.
[11] T. A. Duong "*Real Time On-Chip Sequential Adaptive Principal Component Analysis for Data Feature Extraction and Image Compression*", GOMAC Tech-03, Vol. I, pp. 460-464, Tampa, Fla., 31 Mar.-3 Apr. 2003.
[12] D. L. Donoho, "*Compressed sensing,*" IEEE Trans. Information Theory, vol. 52, no. 4, pp. 1289-1306, April 2006.
[13] E. J. Candès and T. Tao, "*Decoding by linear programming,*" IEEE Trans. Inf. Theory, vol. 51, no. 12, pp. 4203-4215, December 2005.
[14] M. Rudelson and R. Veshynin, "*Geometric approach to error correcting codes and reconstruction of signals,*" Int. Math. Res. Not., vol. 64, pp. 4019-4041, 2005.
[15] E. J. Candès and T. Tao, "*Near-optimal signal recovery from random projections: Universal encoding strategies?,*" IEEE Trans. Inf. Theory, vol. 52, no. 12, pp. 5406-5425, December 2006.
[16] S. K. Mendis, et al, "*CMOS Active Pixel Image Sensors for Highly Integrated Imaging Systems*," IEEE J. Solid-State Circuits, Vol. 32, No. 2, February 1997.
[17] Than A. Duong, S. P. Eberhardt, T. Daud, and A. Thakoor, "*Learning in neural networks: VLSI implementation strategies*," In: Fuzzy logic and Neural Network Handbook, Chap. 27, Ed: C. H. Chen, McGraw-Hill, 1996.
[18] U.S. Pat. No. 5,479,579.
[19] U.S. Pat. No. 6,513,023.
[20] T. A. Duong and Allen R. Stubberud, "*Convergence Analysis Of Cascade Error Projection: An Efficient hardware learning algorithm*", International Journal of Neural System, Vol. 10, No. 3, pp. 199-210, June 2000.
[21] Ashok, M. A. Neifeld, "*Pseudrandom phase masks for superresolution imaging form subpixel shifting*," Appl. Opt. 46, 2256-2268 (2007).
[22] D. E. Rumelhart, and J. L. McClelland, "*Parallel Distributed Processing: Explorations in the Microstructure of Cognition. Vol. 1: Foundation*". MIT Press, Cambridge, Mass. 1986.

The invention claimed is:

1. A compressive sensing-based bio-inspired shape feature detection imager circuit comprising a plurality of circuits operatively coupled to one another, the plurality of circuits comprising:

an active pixel sensor array configured to collect an image in an original space and generate an analog representation of the collected image;

a bio-inspired shape feature compressive sensing projection matrix circuit configured to project the analog representation of the collected image simultaneously onto each target bio-inspired feature of a set of target bio-inspired features and map the projected image from an original space to a compressive sensing space, and generate i) correlation data of the projected image in the compressive sensing space to the set of target bio-inspired features, and ii) reference position data in the original space for the collected image;

a target detection and location circuit configured to process the correlation data and the reference position data to identify a potential target in the collected image from amongst the set of target bio-inspired features;

a compressive sensing sampling data array circuit configured to process the projected image in the compressive sensing space to recover a digital representation of the collected image in the original space, and generate position and identity information of an identified potential target within the recovered collected image in the original space; and an adaptive target extraction circuit configured to track the identified potential target in a next collected image and extract a corresponding new feature from the next collected image to add to the set of target bio-inspired features.

2. The imager circuit of claim 1, wherein the analog representation of the collected image comprises a plurality of voltages in correspondence of a plurality of pixels of the active pixel sensor array, and wherein the projection matrix circuit is further configured to divide the analog representation of the collected image into a plurality of analog representations in correspondence of a plurality of non-overlapping sub-windows of a same size of the collected image, and project an analog representation of each non-overlapping sub-window sequentially.

3. The imager circuit of claim 2, wherein the projection matrix circuit further comprises a low power hybrid memory-digital-analog-converter (MDAC) circuit and a static random-access memory (SRAM).

4. The imager circuit of claim 3, wherein the set of target bio-inspired features is stored as digital values in the SRAM.

5. The imager circuit of claim 4, wherein for a target bio-inspired feature of the set of target bio-inspired features a plurality of shifted representations across the non-overlapping input sub-windows is stored as digital values in the SRAM.

6. The imager circuit of claim 4, wherein the set of target bio-inspired features is extracted from a statistical data set of a saccadic eye movement samples.

7. The imager circuit of claim 4, wherein the projection matrix circuit is further configured to feed an analog representation of a non-overlapping sub-window to an analog input of the low power MDAC and to initialize a plurality of weights of the low power MDAC with digital values from the SRAM corresponding to the set of target bio-inspired features.

8. The imager circuit of claim 7, wherein the projection matrix circuit performs edge detection on the projected image to map the projected image from the original space to the compressive sensing space.

9. The imager circuit of claim 8, wherein the edge detection uses a principal component analysis technique implemented in the projection matrix circuit.

10. The imager circuit of claim 9, wherein the correlation data are generated using a compressive convolution technique implemented in the projection matrix circuit.

11. The imager circuit of claim 10, wherein the recovery of the collected image is performed by a mutual correlation algorithm implemented in the compressive sensing sampling data array circuit.

12. The imager circuit of claim 11 implemented in an integrated circuit.

13. The imager circuit of claim 12, wherein the integrated circuit is a complementary metal-oxide-semiconductor (CMOS) integrated circuit.

14. A computational camera comprising the imager circuit of claim 11.

15. A method used in an imager integrated circuit (IC) for detecting a potential target feature from a collected image, the method comprising:

storing in the imager IC a plurality of compressive sensing bio-inspired representations of a plurality of target features into a projection matrix;

dividing in the imager IC the collected image into a plurality of non-overlapping sub-windows of a same size;

projecting in the imager IC a sub-window of the plurality of sub-windows onto the projection matrix;

based on the projecting, obtaining in the imager IC a compressive sensing sub-window;

generating in the imager IC correlation data of the compressive sensing sub-window to the plurality of target features;

assigning in the imager IC reference position of the sub-window within the collected image to the correlation data;

repeating the projecting, obtaining, generating and assigning for all sub-windows of the plurality of sub-windows;

evaluating in the imager IC the correlation data for all sub-windows;

based on the evaluating, determining in the imager IC a detected potential target;

recovering in the imager IC the collected image based on the compressive sensing sub-windows; and based on the assigning and the determining and the recovering, identifying in the imager IC the detected potential target within the recovered collected image.

16. The method of claim 15 further comprising:
collecting in the imager IC a second image;
based on the determining and the assigning, obtaining in the imager IC a new feature of the detected potential target from the second collected image;
storing in the imager IC a compressive sensing bio-inspired representation of the new feature into the projection matrix;
based on the storing, updating in the imager IC the projection matrix; and
using in the imager IC the updated projection matrix for subsequent detecting.

17. The method of claim 16 further comprising removing from the projection matrix in the imager IC one or more representations of one or more target features.

18. The method of claim 17, wherein the projection matrix in the imager IC further comprises a plurality of projection vectors in correspondence of the plurality of compressive sensing bio-inspired representations, and wherein projecting in the imager IC a sub-window of the plurality of sub-windows onto the projection matrix further comprises simultaneously projecting in the imager IC a sub-window of the plurality of sub-windows onto the plurality of projection vectors.

19. The method according to claim 15, wherein the storing further comprises storing in the imager IC for a target feature of the plurality of target features a plurality of compressive sensing bio-inspired representations of a plurality of shifted representations of the target feature across the non-overlapping input sub-windows.

* * * * *